No. 814,652. PATENTED MAR. 6, 1906.
E. HARROLD & C. G. WILDERSON.
BAND SAW MACHINE.
APPLICATION FILED SEPT. 25, 1905.

3 SHEETS—SHEET 2.

WITNESSES
R. A. Balderson
Warren W. Swartz

INVENTORS
Elmer Harrold
Clinton G. Wilderson
by DeReuser & Byrne
Their attys

No. 814,652. PATENTED MAR. 6, 1906.
E. HARROLD & C. G. WILDERSON.
BAND SAW MACHINE.
APPLICATION FILED SEPT. 25, 1905.

3 SHEETS—SHEET 3.

WITNESSES
R. A. Balderson.
Warren W. Swartz

INVENTORS
Elmer Harrold
Clinton G. Wilderson
by Bakewell Byrnes
their attys

UNITED STATES PATENT OFFICE.

ELMER HARROLD AND CLINTON G. WILDERSON, OF LEETONIA, OHIO.

BAND-SAW MACHINE.

No. 814,652. Specification of Letters Patent. Patented March 6, 1906.

Application filed September 25, 1905. Serial No. 279,903.

*To all whom it may concern:*

Be it known that we, ELMER HARROLD and CLINTON G. WILDERSON, of Leetonia, Columbiana county, Ohio, have invented a new and useful Improvement in Band-Saw Machines, of which the following is a full, clear, and exact description, reference being had to the accompanying drawings, forming part of this specification, in which—

Figure 1:
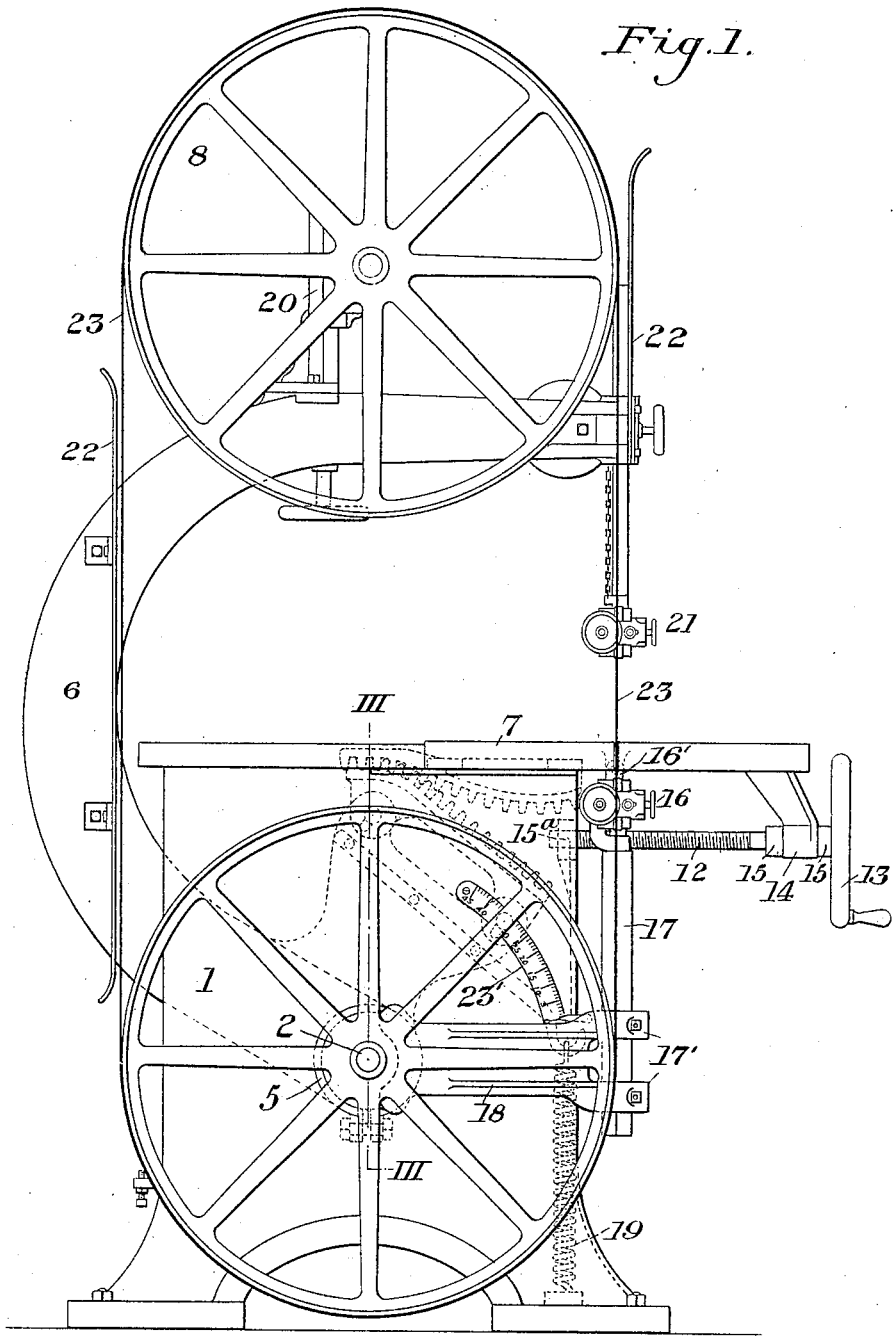
Figure 2:
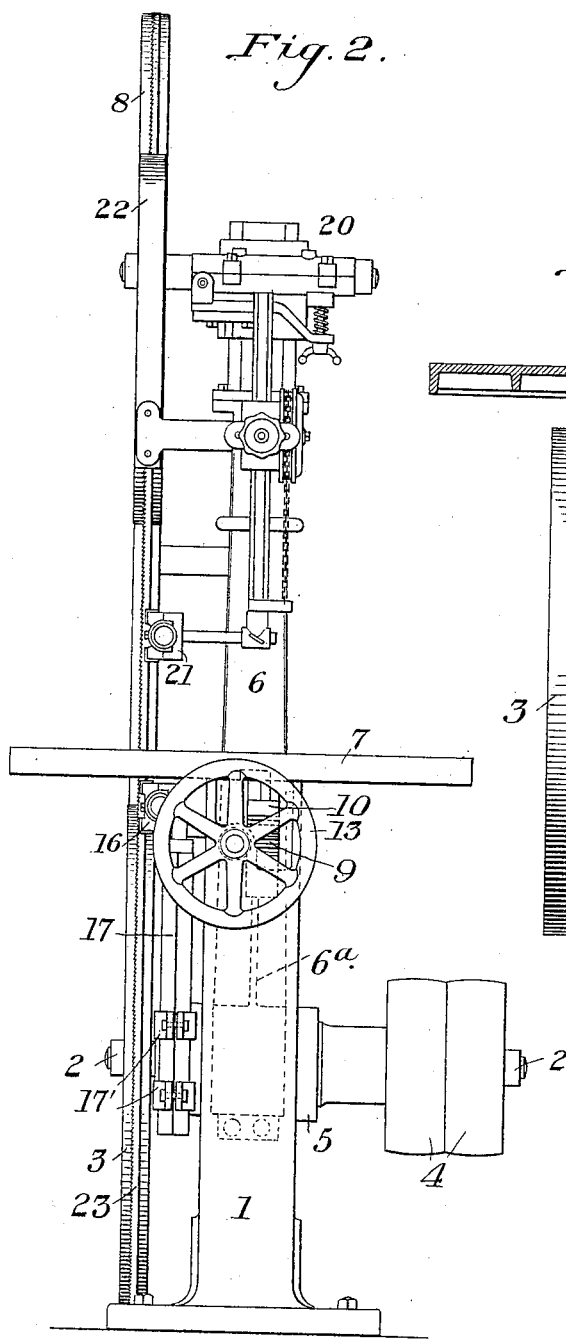
Figure 3:
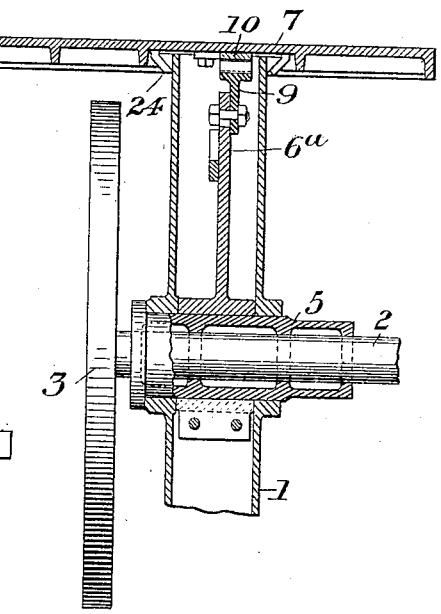
Figure 4:
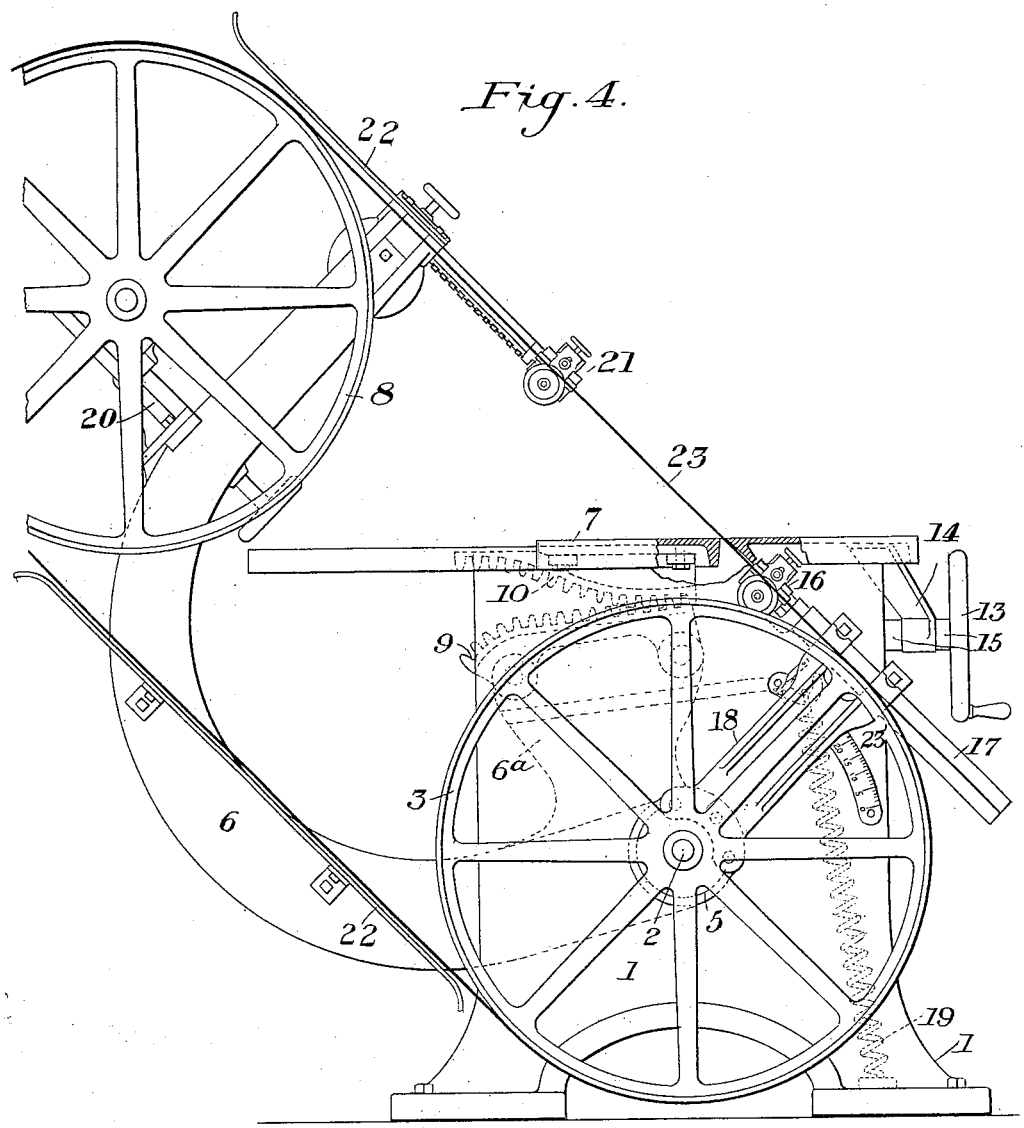

Figure 1 is a side elevation of a band-saw machine embodying our invention. Fig. 2 is a front view of the same. Fig. 3 is a section on the line III III of Fig. 1, and Fig. 4 is a side elevation showing the inclined position of the saw and the adjacent parts.

Our invention relates to that class of band-saws in which the table remains horizontal in all positions of the saw, the upper band-wheel being mounted on a curved arm, which may be swung back to effect the desired angular adjustment of the saw; and our object is to provide actuating means of simple character for the table and band-wheel whereby the table will move backward and forward in unison with the same, so that the table is at all times in proper position with respect to the saw and manual adjustment of the throat in the table is obviated; also, to provide means for keeping the lower saw-guide in proper relation to the table in all positions of the latter. We accomplish these objects by means of a peculiarly arranged and constructed actuating-gear adapted to compensate for the varying horizontal movement of the saw-band as its angular adjustment becomes greater or less, and thereby to cause the upper band-wheel-carrying arm or yoke to move in such a determined relation to the horizontally-moving table that the saw-band at all time passes centrally through the table-throat. We also provide a guide-arm for the lower saw-guide connected to the movable yoke in such manner as to maintain the guide in proper relation to the saw and table.

Our invention further consists in the novel construction, arrangement, and combination of parts, all substantially as hereinafter described, and pointed out in the claims.

In the drawings, 1 designates the fixed pedestal or base, in which is journaled the power-shaft 2, carrying the lower band-wheel 3.

4 designates the driving-pulleys.

5 is a sleeve or trunnion fixed to the base or pedestal and in which the shaft 2 has its bearings.

6 is the movable yoke or arm, which overhangs the horizontal table 7 and carries the upper band-wheel 8. This arm or yoke is sleeved on the trunnion 5, upon which it centers and tilts. Rigidly secured to the upward extension $6^a$ of the yoke or arm below the table is a toothed segment 9, the pitch-line of whose teeth is not on the arc of a circle, but on an irregular line. We have shown this line as a peculiar combination of curved and straight lines; but it will be understood that we do not limit ourselves to any particular curve, since we consider ourselves the first to provide a table connection which will keep the saw and slot or throat in registry in the different positions. These teeth mesh with the teeth of a rack 10, secured to the under side of the table, the pitch-line of which is also compound, being preferably a straight line for a portion of its length and a curve for the remainder of its length. 12 is an actuating-screw provided with a hand-wheel 13. This screw is carried in a depending bracket 14 on the under side of the table and in which it is prevented from endwise movement by the collars 15. The inner end of the screw also has a threaded bearing in a fixed nut or boss $15^a$ of the pedestal. 16 is the lower saw-guide, of any usual or suitable character, carried by a guide-bar 17, which is slidingly supported at its lower end in the bifurcated arms 17' of an arm 18, which is rigidly secured to the hub portion of the said trunnion 5. The lower guide 16 is linked to the table by a pivotal connection, (shown at 16',) which allows tilting of the guide with the saw, but holds it in proper relation to the table. 19 is a counterbalance-spring connected to said yoke forward of its center.

20 designates the usual adjustment for the upper band-wheel; 21, the upper saw-guide, also of any usual or approved character, and 22 indicates guards for the saw-band.

23 designates a band-saw.

23' is a scale for indicating the angular adjustment.

The operation of the machine is as follows: The normal position for square sawing is as shown in the drawings. To adjust the machine for angle sawing, the screw 12 is actuated by means of the hand-wheel 13. This moves the table 7 horizontally backward on its guides 24 (shown in Fig. 3) and by the engagement of the teeth of the rack 10 with the teeth of the segment 9 rocks the arm or yoke 6 backwardly on the trunnion 5 to bring the saw to the desired angle. It will be obvious that the greater becomes the angular position of the saw-band the shorter is the horizontal movement of the same for a given angular movement of the yoke, and it is this fact which in prior machines of the general type has made it impossible to secure the proper relative movement of saw and table, as the actuating mechanism employed has not been arranged to compensate for this difference of movement. The peculiar shape of the segment and rack above described has been particularly designed to overcome this difficulty, which it effectually does, inasmuch as the pitch-line, starting as a straight line and terminating in an irregular curve, results in a gradually-increasing angular movement of the yoke for a given horizontal movement of the table, as will be readily seen by reference to Fig. 1. The table and saw are thus moved in exact relation to each other at all times, giving a fixed position on the table for the work and obviating manual adjustments. Obviously no fixed rule can be given for determining the pitch-lines of the rack and segment, as such lines must be laid out with especial reference to the particular machine. This, however, is readily within the province of the draftsman or designer. As the yoke rocks backwardly the arm 18 has a corresponding upward movement, rocking the guide-bar 17 and at the same time sliding upwardly thereon, whereby the proper relation of said guide to the saw and table is maintained.

It will be obvious that various changes may be made in the details of arrangement and construction herein shown and described without departing from the spirit and scope of our invention.

What we claim is—

1. In a band-saw machine, the combination with a rocking yoke carrying the upper band-wheel, a horizontally-movable table, and means for moving the same, of toothed gearing intermediate said yoke and table arranged to cause a varying movement of said yoke as its angular position changes; substantially as described.

2. In a band-saw machine, the combination with an angularly-adjustable yoke carrying the upper band-wheel, a horizontally-movable table, and means for moving the table, of intermeshing gearing connecting the yoke and table and having compound pitch-lines whereby its action varies as the angular position of the yoke changes; substantially as described.

3. In a band-saw machine, the combination with an angularly-movable yoke carrying the upper band-wheel, a horizontally-movable saw-table, and means for moving the said table, of a toothed rack on the table, and a toothed segment on the yoke engaging said rack, said rack and segment having compound pitch-lines; substantially as described.

4. In a band-saw machine, having an angularly-adjustable yoke, a horizontally-movable saw-table, and means for actuating said table, intermeshing segment and rack-gear connecting said table and yoke and having variable pitch-lines to increase the angular movement of said arm with respect to a given movement of the table as the angular position of said arm becomes greater; substantially as described.

5. In a band-saw machine, the combination of an angularly-adjustable yoke carrying the upper band-wheel, and centered on the axis of the lower band-wheel, a toothed segment-arm on said yoke, a horizontally-slidable table, a rack on the under side of said table and having its teeth engaging those of the segment, said rack and segment having their pitch-lines straight at one portion and curved at another portion, and means for actuating the table; substantially as described.

6. In a band-saw machine, the combination with a rocking yoke carrying the upper band-wheel, and actuating means therefor, of a lower band-guide, and a carrier therefor having a sliding support in the said yoke; substantially as described.

7. In a band-saw machine, the combination with a rocking yoke carrying the upper band-wheel, a table, and means for actuating said yoke and table, of a lower band-guide, a support for said guide, and a slidable connection between the support and the said yoke; substantially as described.

8. In an adjustable band-saw machine having a horizontally-movable table and a tilting yoke for its upper band-wheel, a lower saw-guide linked to the table; substantially as described.

9. In an adjustable band-saw machine having a horizontally-movable table and a tilting yoke for its upper band-wheel, a guide-arm secured to the trunnion of the tilting yoke and a saw-guide movably supported in the said arm; substantially as described.

10. A band-saw machine having a horizontally-movable table, and a tilting yoke carrying the upper band-wheel, a lower saw-guide secured to the trunnion of the tilting yoke, and a link connection between said guide and the table; substantially as described.

In testimony whereof we have hereunto set our hands.

ELMER HARROLD.
CLINTON G. WILDERSON.

Witnesses:
JOHN B. MORGAN,
CORA A. RANKIN.